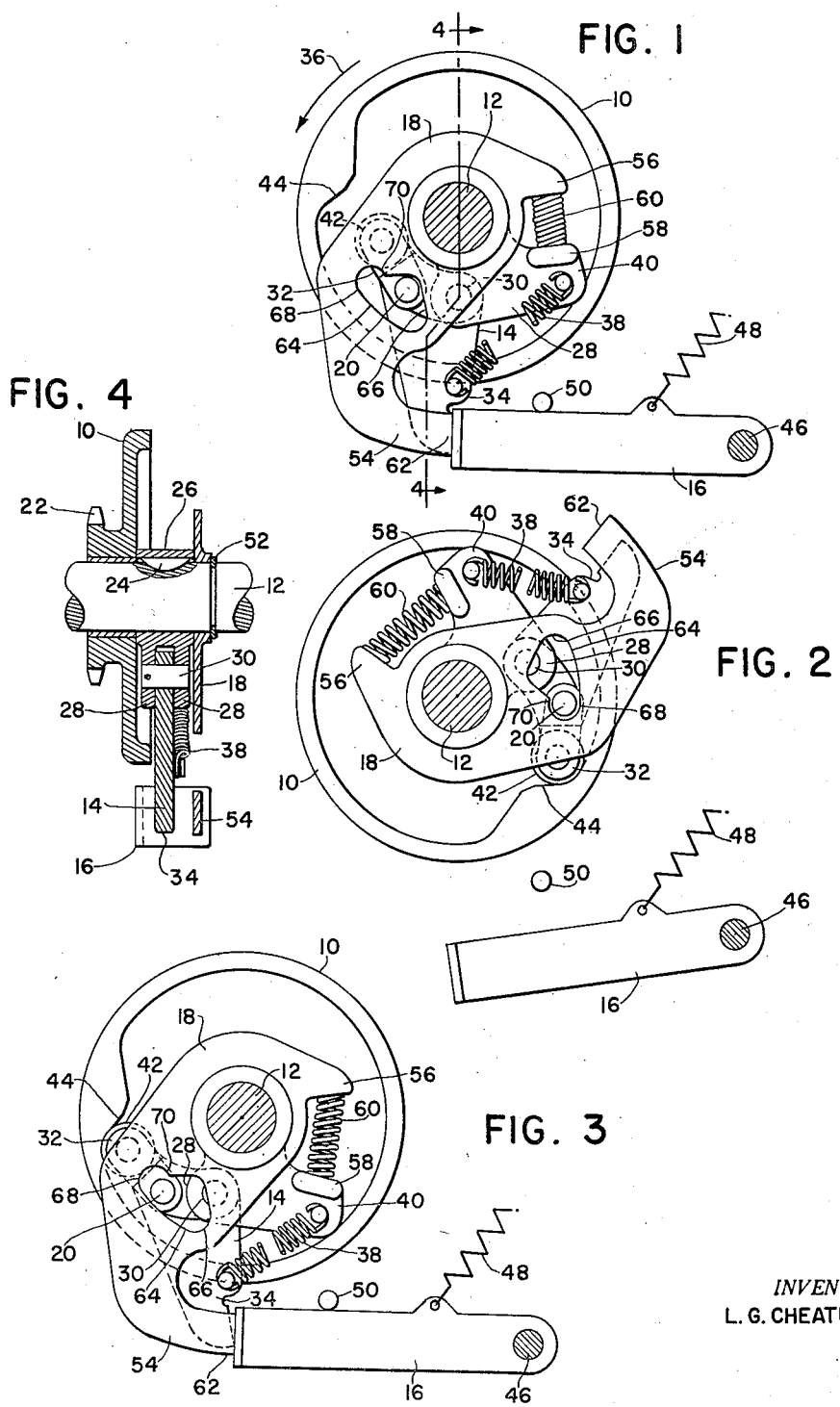

United States Patent Office 2,822,904
Patented Feb. 11, 1958

1

2,822,904

CLUTCH

Leo G. Cheatum, Ottumwa, Iowa, assignor to Deere Manufacturing Co., Dubuque, Iowa, a corporation of Iowa Application December 22, 1955, Serial No. 554,766

8 Claims. (Cl. 192—26)

This invention relates to a clutch and more particularly to improvements in a clutch of the self-interruptible type.

The principal object of the invention is to provide releasable means automatically effective upon engagement of the clutch to maintain the driving pawl in engagement and against release until such time as the clutch is positively disengaged. A mechanism of this type is important from the standpoint of preventing inadverent disengagement of the clutch in situations in which engagement of the clutch is necessary to the continuity of operation in a driving arrangement in which timed co-ordination of several driving parts is important. For example, in the case of an agricultural baler in which a clutch of the self-interruptible type is utilized to drive tying needles into and out of a bale case in advance of a baling plunger, it is necessary that the clutch remain engaged until the needles are withdrawn from the bale case; otherwise the needles would be engaged and damaged by the incoming (or next) charge of material. Consequently, the present invention finds particular utility in an environment of the character noted, the lock serving as a safety means for preventing inadvertent disengagement of the clutch until the tying operation is complete.

It is an important object of the invention to provide a novel design that may be readily incorporated in self-interrupting clutches of conventional design. Another object of the invention is to provide an over-all improved clutch of novel and compact construction.

The foregoing and other important objects and desirable features inherent in and encompassed by the invention will become apparent as a preferred embodiment thereof is diclosed in detail in the ensuing specification and accompanying sheet of drawings, the several figures of which will be described immediately below.

Fig. 1 is an elevational view showing the clutch parts in the respective positions that they occupy when the clutch is disengaged.

Fig. 2 is a similar view showing the clutch parts in engaged relation.

Fig. 3 is a similar view showing the status of the clutch just prior to disengagement thereof.

Fig. 4 is a section on the line 4—4 of Fig. 1.

The clutch chosen for the purposes of illustration comprises only a few basic parts; namely, a first or driving member 10, a second or driven member 12, a drive pawl 14, trip means 16, and the improved safety lock means which comprises a lock element 18, separate from the pawl 14, and a lock pin 20 carried by the pawl.

The driven member 12 is here in the form of a shaft on which the driving member 10 is journaled. The shaft may be connected to any source that requires the transmission of driving power thereto, while the driving member or drum 10 may receive a source of input power, as via an integral sprocket 22 (Fig. 4). Control of the pawl 14 by the trip means 16 is operative, selectively, to engage or disengage the clutch for respectively causing rotation of the parts in unison or relative to each other.

2

Fundamentally, these characteristics are present in any self-interrupting clutch.

The driven member or shaft 12 has keyed thereto at 24 an annular hub 26 on which is provided a pair of alined and apertured ears 28 which carry a pivot pin 30 for rockably supporting the pawl 14. The pawl is in the form of a bell crank, having a drive arm 32 and a control arm 34. The power input to the driving member 10 causes its normal direction of rotation to occur as indicated by the arrow 36 (Fig. 1). The control arm 34 on the pawl extends generally radially as respects the axis of the pivot 30 and also as respects the axis of rotation of the clutch; and the drive arm 32 extends in a direction counter to the direction of rotation as indicated by the arrow 36. The pivot 30 mounts the pawl 14 on the driven member 12 for movement with said member and for movement also relative to said member, the relative movement being rocking movement and occurring selectively in opposite directions, one of which directions is an advanced direction as respects the direction of rotation of the clutch and the other of which directions is a retard direction. A tension spring 38 interconnects the control arm 34 and an extension 40 on the pawl-mounting ears 28 and operates as means biasing the pawl 14 to rock in an advanced direction relative to the driven member 12.

When the pawl 14 is held in its retarded position and against the bias of the spring 38 (Fig. 1), which function is effected by the trip means 16 in its stop position, the pawl drive arm 32 is urged into a radially inward position so that a roller 42 thereon is radially inwardly of and clear from engagement with a drive lug or hump 44 on the inner periphery of the drum-like driving member 10. The trip means 16, which comprises a lever pivoted at 46 and biased by a spring 48 against a stop 50, which determines the stop position of the trip means, is in engagement with the control arm 34 of the pawl 14 to effect disengagement or disconnection of the clutch members 10 and 12. Hence, the driven member or shaft 12 may remain stationary while the driving member 10 continues to rotate in the direction of the arrow 36.

When the trip means 16 is moved to its trip position (Fig. 2), which may occur manually or automatically in response to some other operation, the free end of the trip means clears the end of the control arm 34 of the pawl 14 so that the pawl biasing spring 38 causes the pawl to advance relative to the temporarily stationary driven member 12. As the pawl advances, the drive arm 32, which carries the roller 42, moves radially outwardly and into the path of the drive lug 44, to be engaged by that drive lug and thereby to establish a driving connection between the two members, whereby the two members and the pawl rotate in unison. Limits upon the angular or rocking movement of the pawl 14 about its pivot 30 are established on the one hand by the hub 26, which limits radially inward movement of the pawl, and on the other hand by the inner periphery of the driving member 10, which limits radially outward movement of the pawl. As best seen in Fig. 2, the engagement between the clutch members will continue as long as the pawl occupies a position in which the drive lug 44 engages the roller 42. Since the pawl is held in engaged position primarily by the tension in the spring 38 and by components of forces involved in the shape of the drive lug 44, the length of the drive arm 32 and the position of the pivot 30, it will be readily seen that any obstacle interposed in the path of the control arm 34 as it rotates with the engaged clutch will retard the pawl and cause the roller 42 to become disengaged from the drive lug 44. Normally, disengagement of the clutch is desirable at a predetermined time, conventionally after the clutch has been engaged for one revolution, which is effected by return of the trip means 16 from its trip position of Fig. 2 to its stop position of Figs. 1 and 3. However, it is undesirable to permit the pawl to become disengaged except by proper operation of the trip means.

It is in this phase of the clutch design that the lock means, comprising the lock element or plate 18 and the pawl pin 20 become significant. As will be noted, the plate or element 18 is rockably carried by the drive member, being preferably coaxially journaled thereon and retained by a snap ring 52, for example (Fig. 4). The lock element is therefore free to rock on the shaft 12 relative to the shaft and also relative to the pawl 14. The element includes a control arm 54 which extends generally radially and alongside the pawl control arm 34. An integral tail piece 56 on the element lies in angularly spaced relationship to a ledge 58 on the ear extension 40 and between this ledge and tail piece 56 is interposed a compression spring 60 which serves as biasing means to cause the element to rock in an advanced direction. Since the control arm 54 is engaged, via a projection 62 thereon, by the trip means 16, along with engagement of the control arm 34 of the pawl 14, the element 18, like the pawl, is urged or forced into a reverse or retard direction as respects the direction of travel of the engaged clutch (arrow 36). In view of the lock and release relationship between the pawl-carried lock pin 20 and a slot 64 formed in the plate or element 16, the advanced direction of movement of the element is a lock direction and the reverse or retard direction is a release direction.

The slot 64, and the configuration thereof, and the locking pin 20 serve as means for selectively locking and releasing the lug-engaged pawl, and this means is under control of the trip means 16, the details of which phase of the operation will be set forth immediately. As will be seen, the slot 64 has first and second angularly related portions 66 and 68. The slot portion 66 is enlarged or extends radially so as to accommodate radial movement of the pin 20 as the pin moves when the pawl 14 rocks back and forth. The rear or second portion 68 of the slot communicates with the radially outermost end of the slot portion 66 and extends angularly in a counter-rotative or retard direction. The inner periphery of the slot 64 is such that the junction of the portions defining the respective margins of the portions 66 and 68 is in the nature of a book 70.

Operation

The clutch is disengaged when the trip means 16 is in the Fig. 1 position, in which position it engages both the pawl control arm 34 and the lock element control arm 54, urging these members in a retard direction against their respective biasing means 38 and 60. The roller 42 on the drive arm 32 of the pawl 14 is therefore disengaged from the lug 44 on the driving member 10 and that driving member may therefore rotate without transmitting power to the driven member 12. When the trip means 16 is moved to the position of Fig. 2, the respective biasing means 38 and 60 cause the pawl 14 and element 18 to advance. As the pawl advances, it rocks in a counterclockwise direction about its pivot 30 and relative to the driven member 12, the lock pin 20 being accommodated, as it moves radially outwardly, by the radially extending portion 66 of the lock element slot 64, whereupon the pin registers with the slot portion 68. Then, as the biasing means 60 causes the element 18 to advance, the pin 20 is received in the slot portion 68 (Fig. 2) and there is established a releasable lock for preventing accidental disengagement of the pawl from the driving member. The prevention of disengagement is accomplished in part by the hook shape 70 of the slot 68, as well as by the pivoting of the element 18 and pawl 14 about different axes. That is to say, the element 18 is rockable about the axis of the shaft 12, whereas the pawl 14 is rockable about the axis of the pin 30, which is spaced radially outwardly from the shaft axis. Consequently, the components of force developed are such as to increase the locking effect in the event that any retarding force is applied solely to the pawl control arm 34.

Upon the completion of one revolution, or as many revolutions or part revolutions as are suitable for the particular function, the trip means 16 is returned to its stop position (Fig. 3). It will be noted from Fig. 2 that when the pawl and element are both advanced, the projection 62 on the element control arm 54 leads the projecting end of the pawl control arm 34. This means that when the trip means 16 is returned to its stop position of Fig. 3, the element control arm will be engaged by the trip means prior to engagement of the pawl control arm 34, thereby retarding the element and the pawl in succession and in the order stated, whereby the element is moved in a retard direction to clear the pin 20 so that when the pawl is retarded the pin 20 can travel radially inwardly in the radial portion 66 of the slot 64.

Summary

In the preferred embodiment of the invention illustrated, the lock element has been added as a supplement to a self-interrupting clutch of conventional construction, which is significant from the standpoint of modifying existing clutches. However, the principles of the invention may be readily applied to clutches of other designs, and the same features of operation will result. Other features of the invention not categorically enumerated will undoubtedly occur to those versed in the art, all of which may be achieved without departing from the spirit and scope of the invention.

What is claimed is:

1. A clutch, comprising: a rotatable driving member having a drive lug thereon in radially spaced relation to the axis of rotation of said member; a rotatable driven member journaled coaxially with the driving member; a pawl connected to the driven member for limited movement relative thereto in an advance direction as respects the direction of rotation of the driving member for engaging the drive lug to connect the members and pawl for rotation in unison, said pawl being oppositely movable in a retarded direction for disengagement from the drive lug, said pawl having biasing means urging it in said advance direction; a lock element connected to the driven member for limited movement relative thereto and relative to the pawl in said advance and retard directions; means biasing the element in said advance direction; lock means on the element operative upon advance of the element and pawl to releasably engage and interlock with the advanced pawl for opposing retarding of the pawl and thereby to prevent disengagement of the pawl from the drive lug; and trip means having a trip position clear of the pawl and element and movable into an element- and pawl-engaging position of direct engagement first with the element and then with the pawl for engaging and retarding the element and pawl in succession to first release the lock means from the pawl and to then disengage the pawl from the drive lug.

2. The invention defined in claim 1, in which: the pawl carries a lock pin projecting in an axial direction therefrom and movable radially outwardly and inwardly respectively as the pawl is advanced and retarded; and the lock means on the element comprises a slot in the element for receiving the pin, said slot having a radial portion in which the pin moves radially when the pawl is advanced and retarded and an angular portion extending in the retard direction from the outer end of said radial portion and into which the pin is received as the element advances relative to the pawl.

3. The invention defined in claim 1, in which: the driven member has a hub part and the pawl is pivoted on the hub part on an axis parallel and adjacent to the rotational axis; and the lock element is rockably mounted coaxially with the driven member whereby advance and retard movements of the pawl and element are about different axes.

4. A clutch, comprising: a rotatable driving member having a drive lug spaced radially from its axis of rotation; a driven member journaled coaxially with the driving member; a pawl pivoted on the driven member on an axis adjacent to and parallel with the axis of rotation for limited rocking relative to the driven member in advance and retard directions as respects the direction of rotation of the driving member, said pawl having a radial control arm and also having a drive arm extending generally in said retard direction; means biasing the pawl to rock in its advance direction for swinging the drive arm radially outwardly into engagement with the drive lug to engage the clutch by effecting connection of the members and pawl for rotation in unison and for simultaneously causing the control arm to advance relative to the driven member; trip means having a trip position clear of the pawl control arm and movable into the path of the control arm, as the pawl travels with the members, to thereby interrupt the travel of the pawl for retarding the pawl to swing the drive arm radially inwardly and clear of the drive lug and thus to disengage the clutch; a lock pin on the pawl drive arm in radially spaced relation to the pawl pivot and projecting axially therefrom; a lock element coaxially carried by and rockable within limits relative to the driven member and pawl in advance and retard directions, said element having a radial arm extending alongside the pawl control arm for engagement with and release from the trip means along with engagement and release of the pawl control arm, said element having a pin-receiving slot therein including first and second angularly related portions, said first portion being generally radial as respects the pawl pivot so as to accommodate the pin when the pawl rocks, and said second portion extending counter to the direction of rotation at the radially outer end of the first portion for register with the pin following advance of the pawl upon release thereof by the trip means; and means biasing the element for advance rocking relative to the pawl when the element arm is released by the trip means, whereby the pin is received in and retained by the second slot portion against radial inward movement for locking the pawl drive arm against release from the drive lug until the element arm is again engaged and retarded by the trip means.

5. A clutch, comprising: a rotatable first member having a drive lug thereon in radially spaced relation to the axis of rotation of said member; a rotatable second member journaled coaxially with the first member; a pawl connected to the second member for limited movement in one direction to engage the drive lug for connecting the members and pawl for rotation in unison and in the reverse direction for disengagement from the drive lug to disconnect the members for relative rotation, said pawl having biasing means urging it in said lug-engaging direction; a lock element connected to the driven member for limited movement relative thereto and relative to the pawl in opposite lock and release directions; means biasing the element in said lock direction; lock means on the element operative, upon movement of the element in its lock direction and movement of the pawl in its lug engaging direction, to releasably engage and interlock with the lug engaged pawl for opposing reverse movement of the pawl and thereby to prevent disengagement of the pawl from the drive lug; and trip means having a trip position clear of the pawl and element and movable into an element- and pawl-engaging position of direct engagement first with the element and then with the pawl for successively moving the element in its release direction and the pawl in its reverse direction to first release the lock means from the pawl and to then disengage the pawl from the drive lug.

6. The invention defined in claim 5, in which: the pawl carries a lock pin projecting in an axial direction therefrom and movable radially outwardly and inwardly respectively as the pawl moves in its lug-engaging and reverse directions; and the lock means on the element comprises a slot in the element for receiving the pin, said slot having a radial portion in which the pin moves radially when the pawl moves and an angularly related portion extending from the outer end of said radial portion and into which the pin is received and from which the pin is released as the element moves respectively in its lock and release directions relative to the pawl.

7. A clutch, comprising: a rotatable first member having a drive lug thereon in radially spaced relation to the axis of rotation of said member; a rotatable second member journaled coaxially with the first member; a pawl connected to the second member for limited movement in one direction to engage the drive lug for connecting the members and pawl for rotation in unison and in the reverse direction for disengagement from the drive lug to disconnect the members for relative rotation, said pawl having biasing means urging it in said lug-engaging direction; trip means having a trip position clear of the pawl and movable into a stop position in the path of the pawl, as the pawl rotates in unison with the members, for directly engaging the pawl to cause said pawl to move reversely and out of engagement with the drive lug; and lock means movable on the second member relative to said second member and relative to the pawl and actuated by the trip means to lock the pawl in engagement with the lug when the trip means is in its trip position and to release the pawl for disengagement from the lug when the trip means is in its stop position.

8. The invention defined in claim 7 in which: the pawl and the lock means respectively include radial control arms engaged by and released from the trip means respectively in the stop and trip positions of said trip means; and the lock means arms includes a projection thereon leading the pawl control arm, as respects the direction of rotation of the members, when both arms are disengaged from the trip means so that, upon movement of the trip means to its stop position the lock means projection engages the trip means prior to the engagement of the trip means by the pawl control arm, whereby the lock means is released from the pawl to enable subsequent release of the pawl from the drive lug.

References Cited in the file of this patent
UNITED STATES PATENTS

| | | |
|---|---|---|
| 670,036 | Schmitt | Mar. 19, 1901 |
| 1,765,527 | Gollnick et al. | June 24, 1930 |
| 2,746,584 | Skromme | May 22, 1956 |